(12) United States Patent
Haida

(10) Patent No.: US 10,891,802 B2
(45) Date of Patent: Jan. 12, 2021

(54) INFORMATION PROCESSING DEVICE, IMAGE FORMING APPARATUS, METHOD FOR MANUFACTURING OUTPUT OBJECT, AND COMPUTER-READABLE RECORDING MEDIUM

(71) Applicant: Kazuo Haida, Kanagawa (JP)

(72) Inventor: Kazuo Haida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 397 days.

(21) Appl. No.: 15/752,317

(22) PCT Filed: Aug. 19, 2016

(86) PCT No.: PCT/JP2016/003790
§ 371 (c)(1),
(2) Date: Feb. 13, 2018

(87) PCT Pub. No.: WO2017/029816
PCT Pub. Date: Feb. 23, 2017

(65) Prior Publication Data
US 2020/0234507 A1    Jul. 23, 2020

(30) Foreign Application Priority Data

Aug. 20, 2015 (JP) .................................. 2015-163247
Jun. 21, 2016 (JP) .................................. 2016-122861

(51) Int. Cl.
*G06T 15/00* (2011.01)
*G06T 19/20* (2011.01)
*B33Y 50/02* (2015.01)

(52) U.S. Cl.
CPC .............. *G06T 19/20* (2013.01); *B33Y 50/02* (2014.12); *G06T 2219/2012* (2013.01); *G06T 2219/2021* (2013.01)

(58) Field of Classification Search
CPC ......... B33Y 30/00; B33Y 50/02; B33Y 10/00; B29C 64/386; B29C 64/393; B29C 64/106; B29C 64/112; G06T 15/00
(Continued)

(56) References Cited

U.S. PATENT DOCUMENTS 9,688,022 B2 * 6/2017 Chang .................... B29C 64/106
10,252,464 B2 * 4/2019 Kuo ......................... B29C 48/92
(Continued)

FOREIGN PATENT DOCUMENTS

EP        1437882 A1    7/2004
JP        2001-301267   10/2001
JP        2013-043338    3/2013

OTHER PUBLICATIONS

Sitthi-Amorn P, Ramos JE, Wangy Y, Kwan J, Lan J, Wang W, Matusik W. MultiFab: a machine vision assisted platform for multi-material 3D printing. ACM Transactions on Graphics (TOG). Jul. 27, 2015;34(4):1-1.*

(Continued)

*Primary Examiner* — Phu K Nguyen
(74) *Attorney, Agent, or Firm* — Harness, Dickey & Pierce, P.L.C.

(57) ABSTRACT

An information processing device includes a corrector and a layer information generator. The corrector is configured to, when a three-dimensional image is to be built by depositing a build material based on height information indicating heights of the three-dimensional image on a per-pixel basis and based on color information indicating colors of the three-dimensional image on a per-pixel basis, correct the height information so that surface of the three-dimensional image is covered with the colors indicated by the color information. The layer information generator is configured to generate layer information indicating, on a per-layer basis, pixel layouts for building the three-dimensional image (Continued)

whose shape is corrected so that the surface of the three-dimensional image is covered with the colors indicated by the color information, based on the corrected height information and the color information.

20 Claims, 12 Drawing Sheets

(58) Field of Classification Search
USPC .......................................................... 345/418
See application file for complete search history.

(56) References Cited

U.S. PATENT DOCUMENTS

| | | | | |
|---|---|---|---|---|
| 10,252,466 | B2* | 4/2019 | Ramos | B33Y 30/00 |
| 10,456,984 | B2* | 10/2019 | Matusik | B29C 64/112 |
| 10,532,513 | B2* | 1/2020 | Bauza | B29C 64/153 |
| 2008/0300704 | A1 | 12/2008 | Watkins et al. | |
| 2018/0169953 | A1* | 6/2018 | Matusik | B29C 64/393 |
| 2019/0315066 | A1* | 10/2019 | Maeda | B29C 64/393 |
| 2020/0147888 | A1* | 5/2020 | Ramos | B29C 64/386 |

OTHER PUBLICATIONS

Stava O, Vanek J, Benes B, Carr N, Měch R. Stress relief: improving structural strength of 3D printable objects. ACM Transactions on Graphics (TOG). Jul. 1, 2012;31(4):1-1.*

Chen G, Chen C, Yu Z, Yin H, He L, Yuan J. Color 3D Printing: Theory, method, and application. New Trends in 3D Printing. Jul. 13, 2016:25-51.*

Xiao K, Zardawi F, van Noort R, Yates JM. Developing a 3D colour image reproduction system for additive manufacturing of facial prostheses. The International Journal of Advanced Manufacturing Technology. Feb. 1, 2014;70(9-12):2043-9.*

Arikan Can Ates et al., "Color-Managed 3D-Printing with highly Translucent Printing Materials", SPIE, vol. 9398, Mar. 13, 2015, pp. 98980S-93980S, XP060050832, DOI:10.1117/12.2083844.

Stanic M et al., "Color and Permanence Issues in 3D Ink-jet Printing", MIPRO, 2010 proceedings of the $33^{rd}$ international convention, IEEE, May 24-28, 2010, pp. 274-277.

International Search Report dated Apr. 13, 2017 in PCT/JP2016/003790 filed Aug. 19, 2016.

Written Opinion of the International Searching Authority PCT/ISA/237 for International Application No. PCT/JP2016/003790 filed Aug. 19, 2016.

* cited by examiner

[Fig. 1]
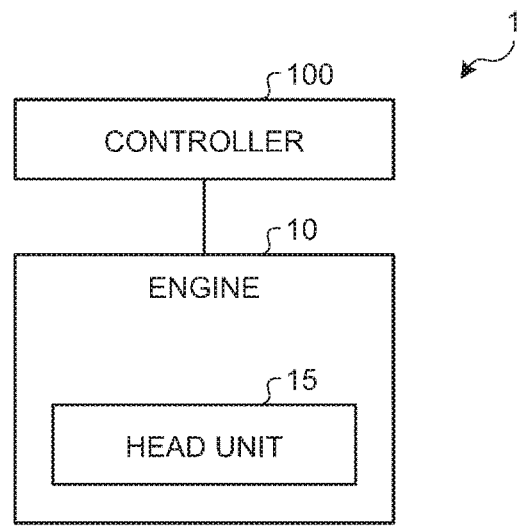
[Fig. 2]
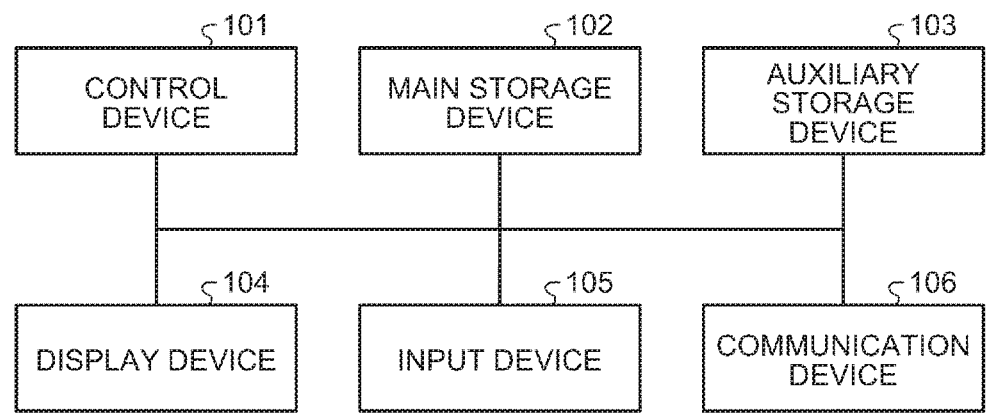

[Fig. 3]
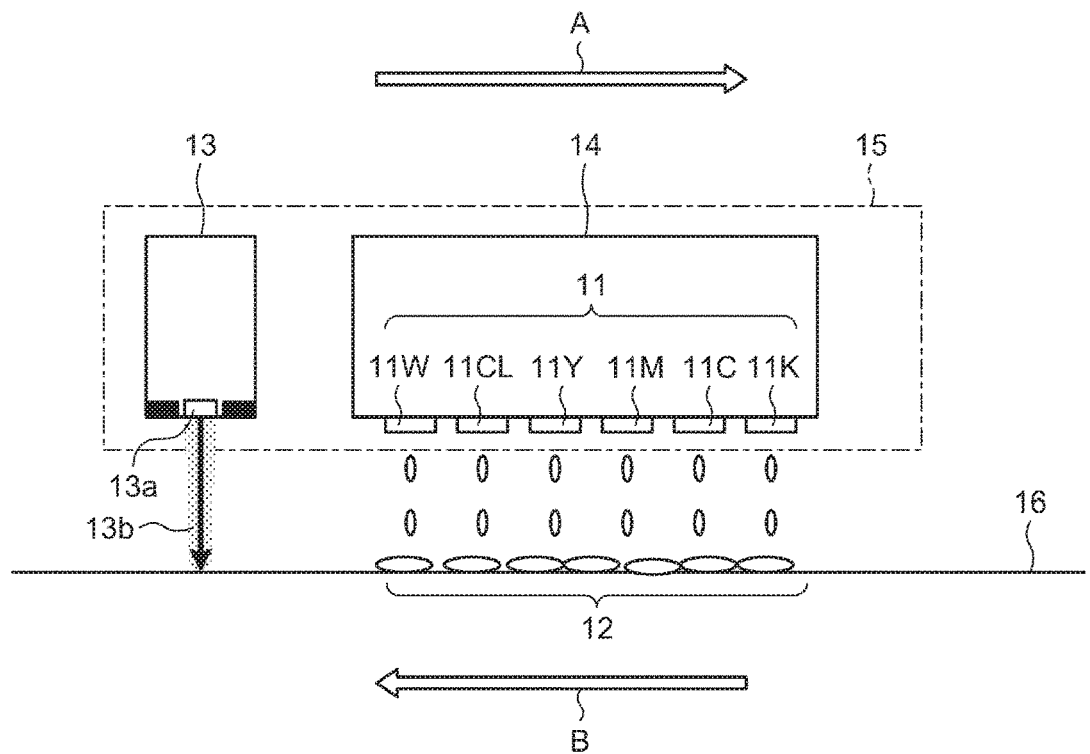
[Fig. 4]
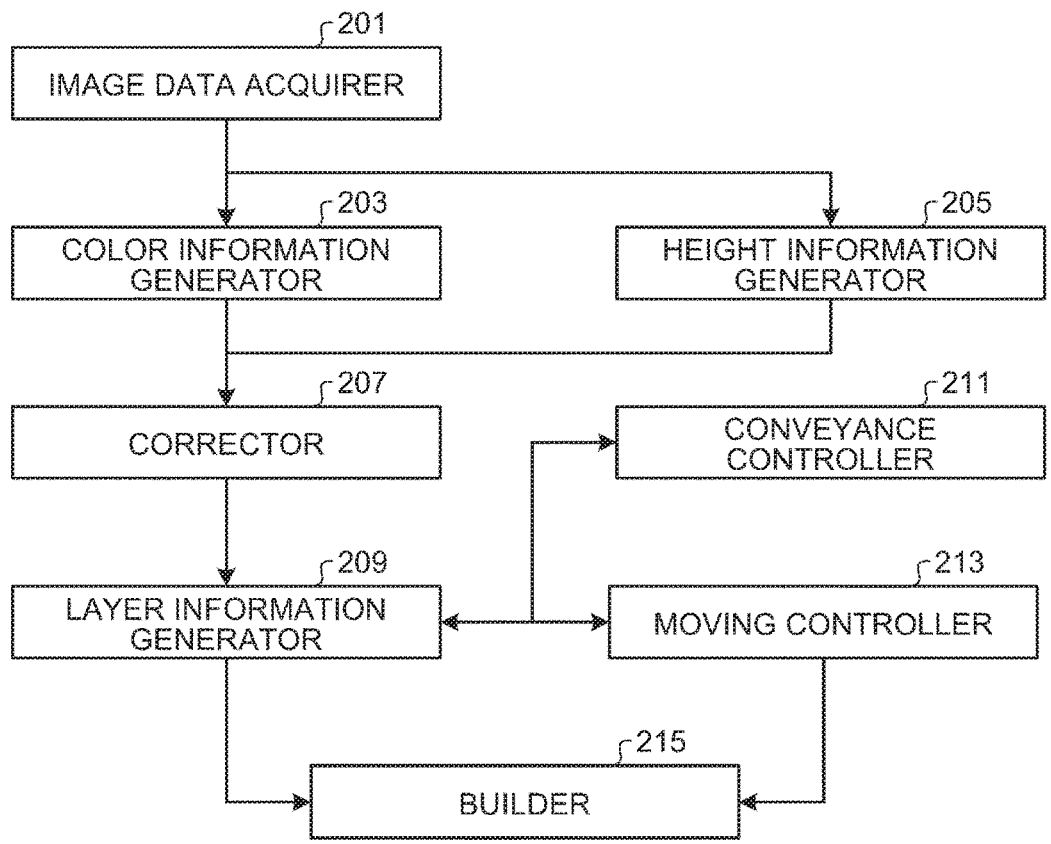

[Fig. 5]
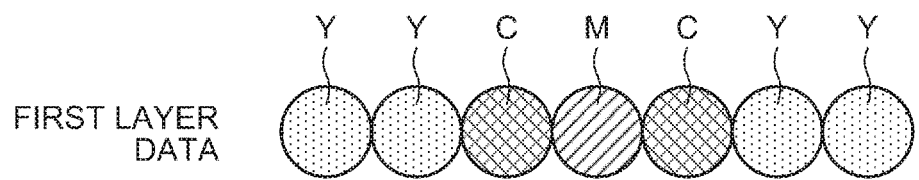
FIRST LAYER DATA
[Fig. 6]
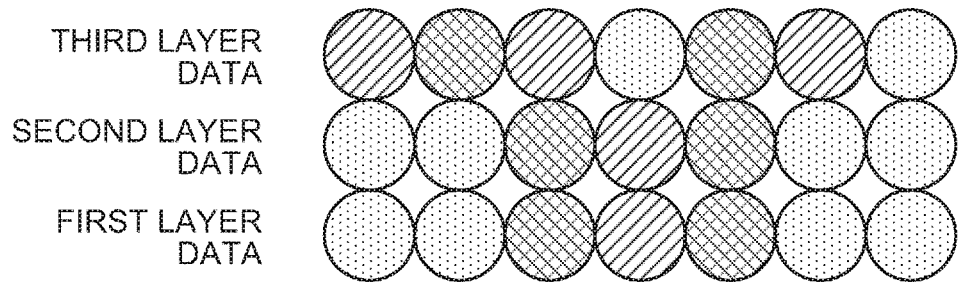
THIRD LAYER DATA
SECOND LAYER DATA
FIRST LAYER DATA
[Fig. 7]
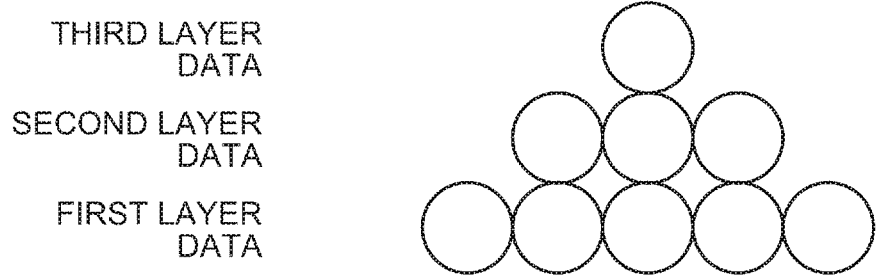
THIRD LAYER DATA
SECOND LAYER DATA
FIRST LAYER DATA

[Fig. 8]
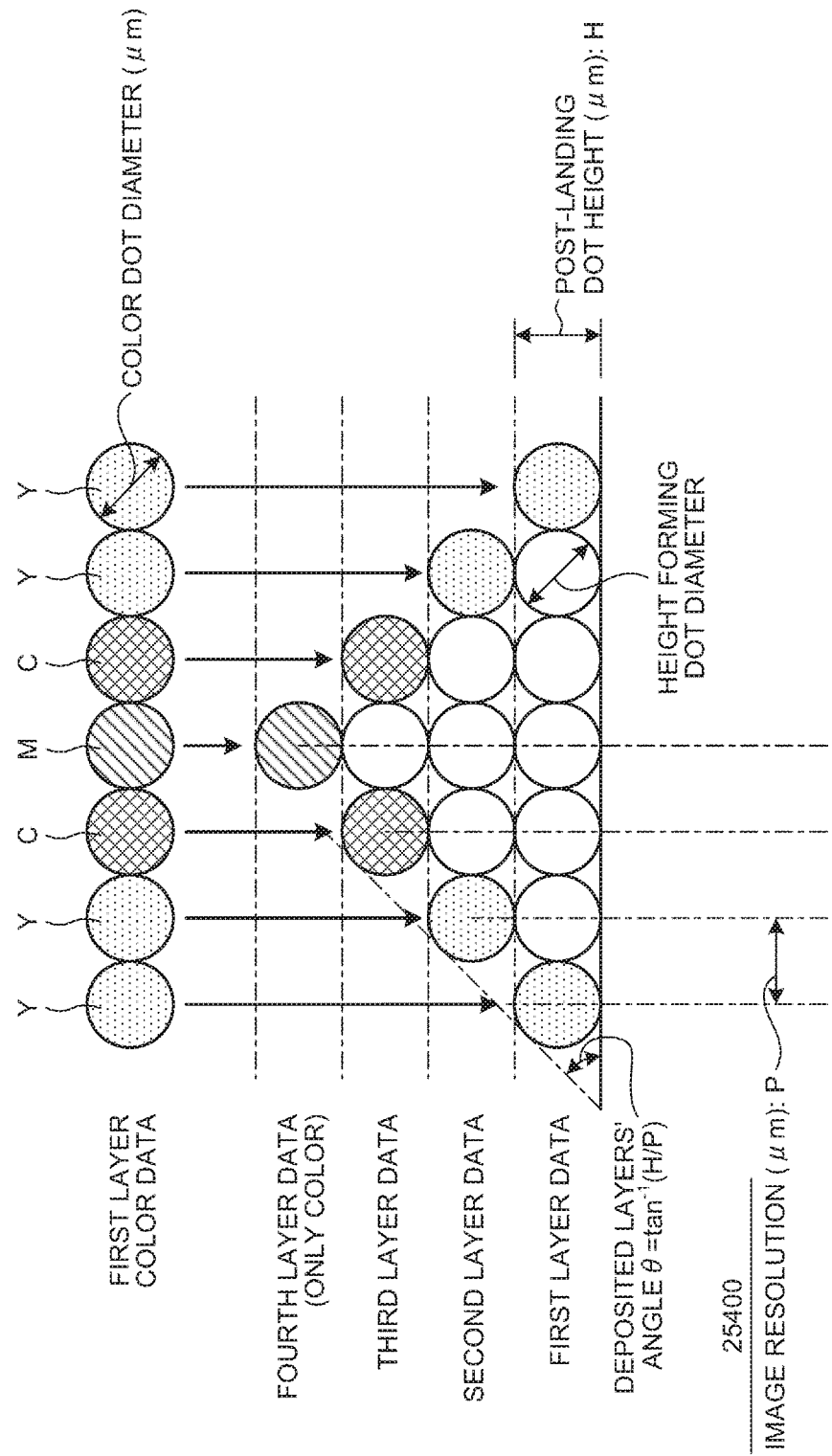

[Fig. 9]
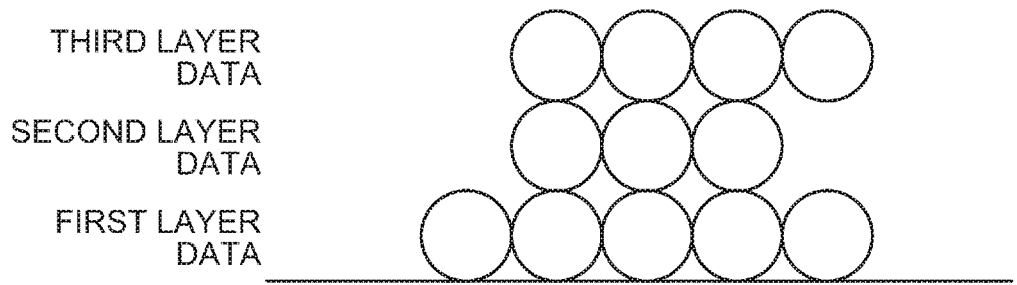
[Fig. 10]
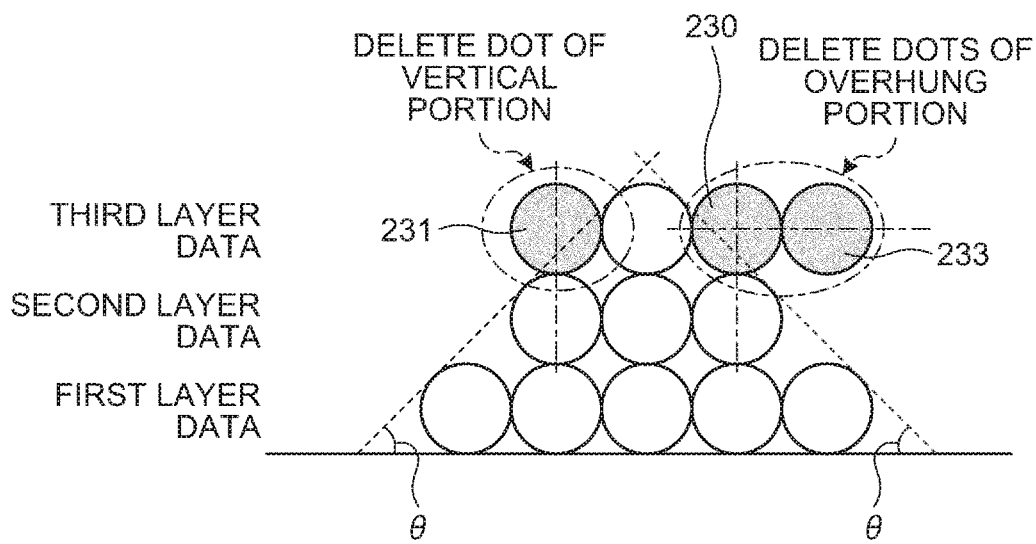

[Fig. 11]
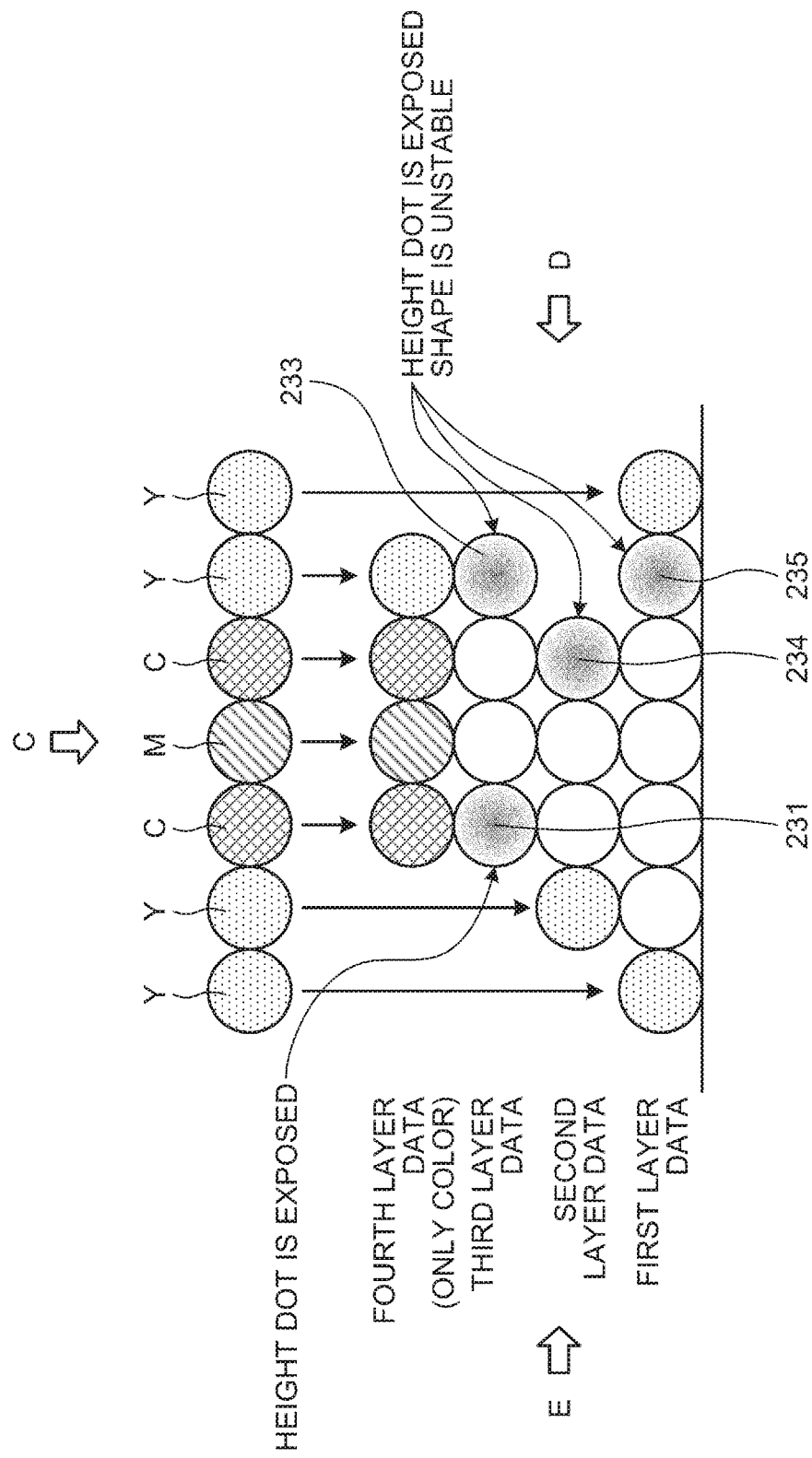

[Fig. 12]
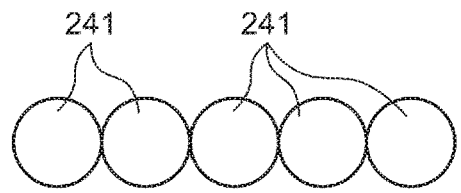
[Fig. 13]
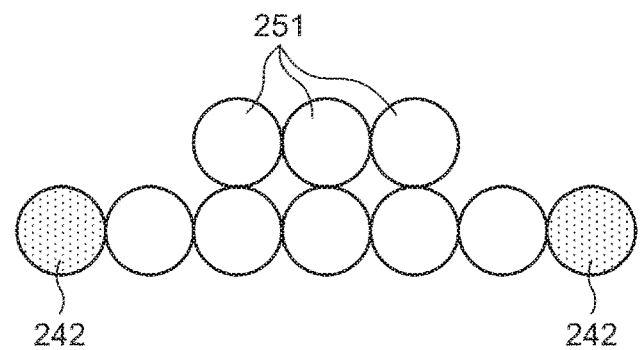
[Fig. 14]
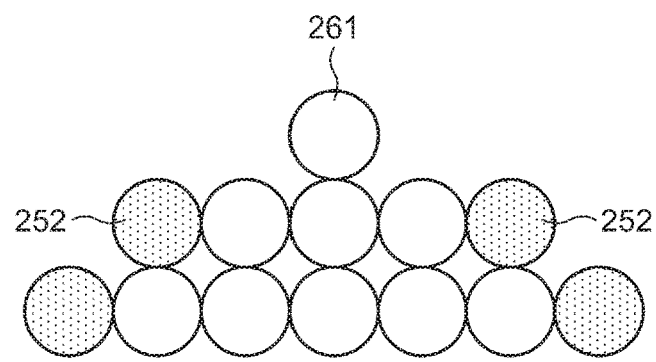
[Fig. 15]
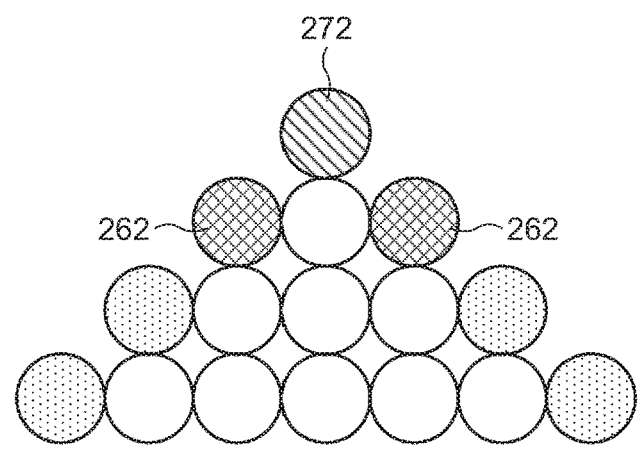

[Fig. 16]
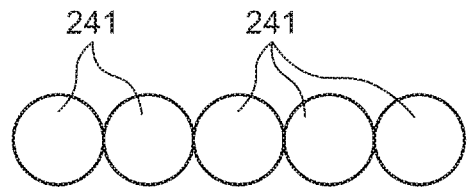
[Fig. 17]
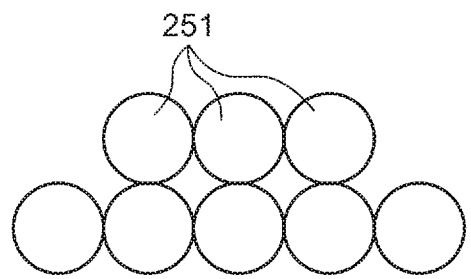
[Fig. 18]
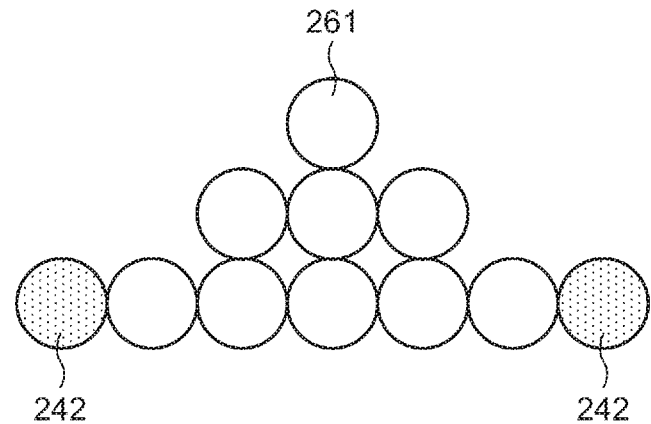
[Fig. 19]
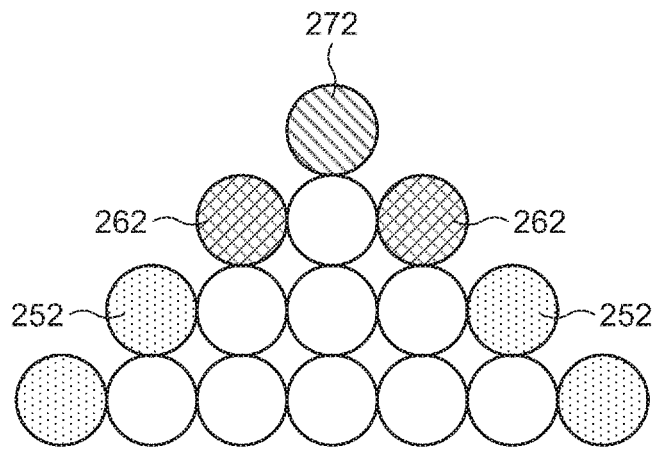

[Fig. 20]
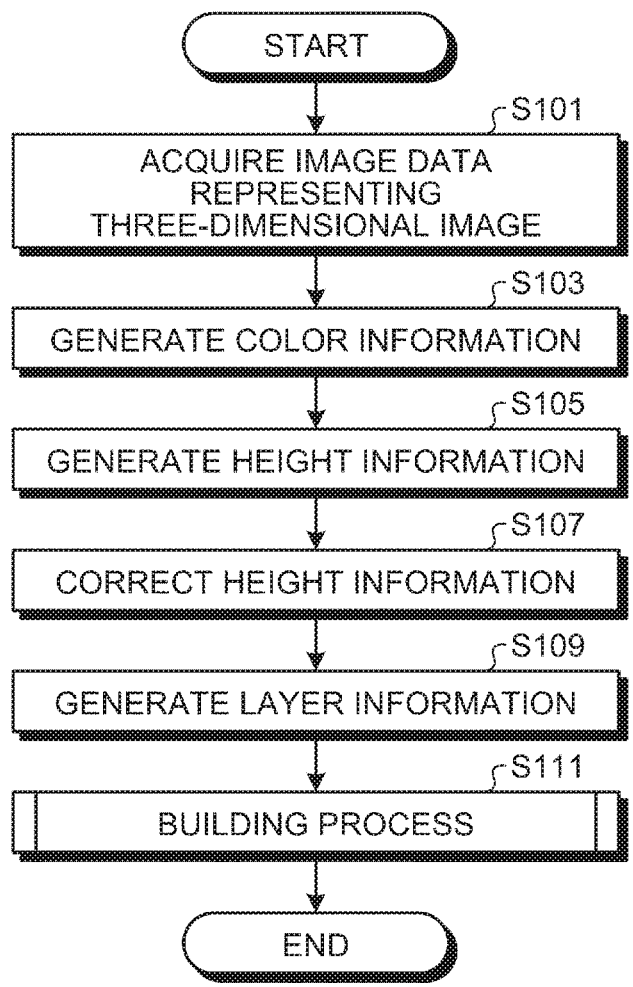

[Fig. 21]
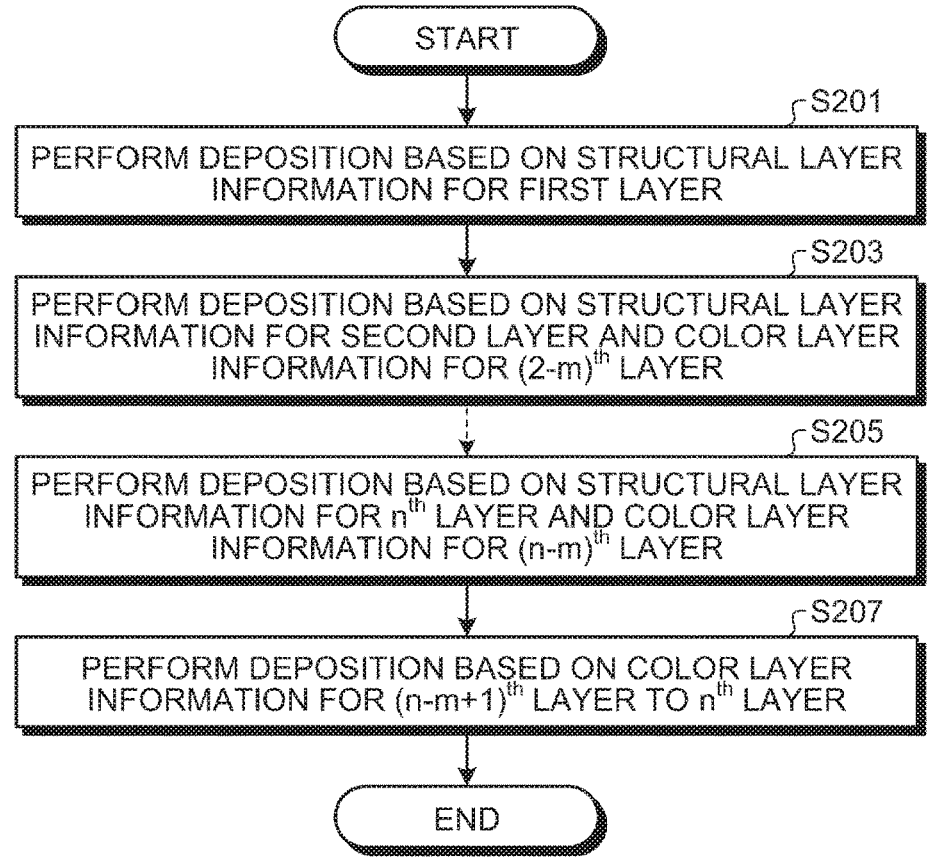
[Fig. 22]
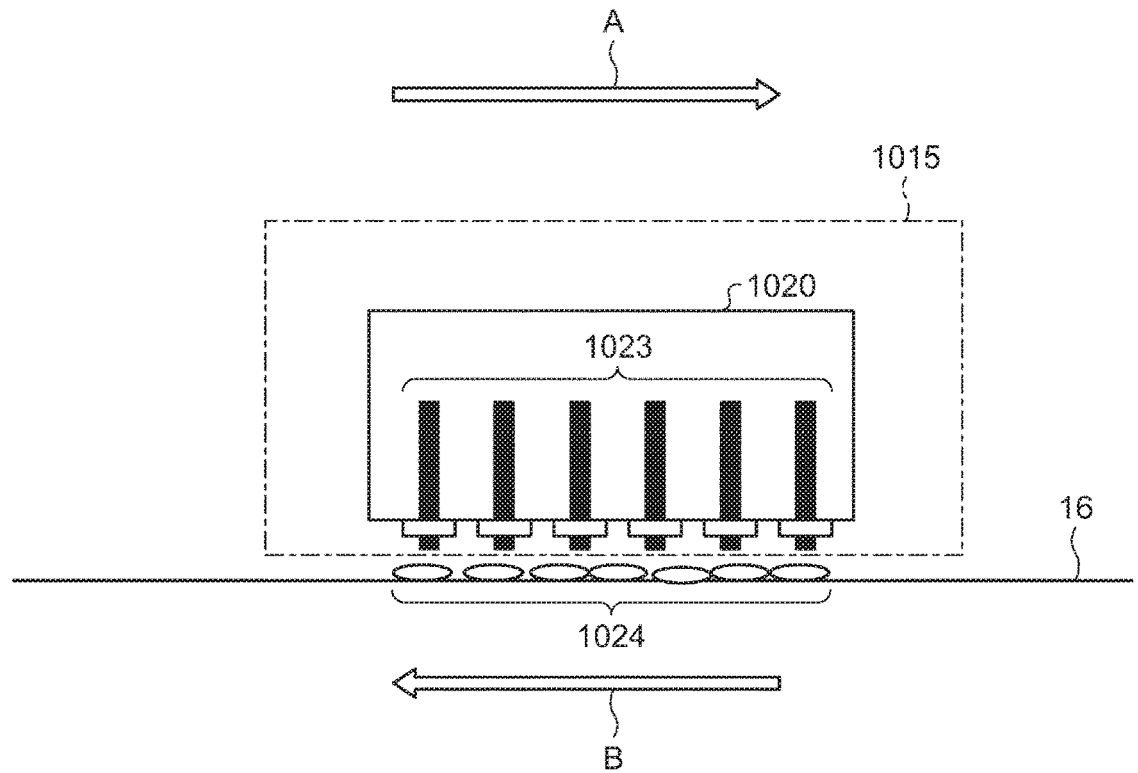

[Fig. 23]
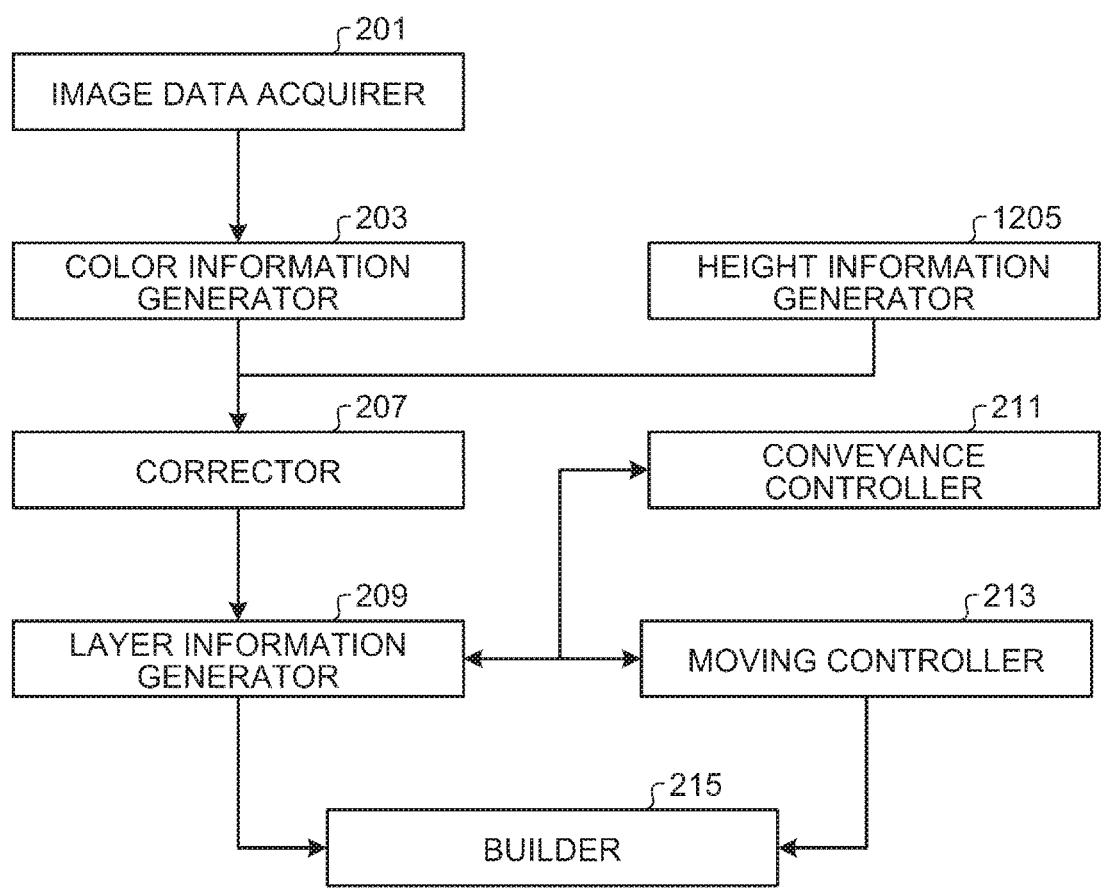

[Fig. 24]
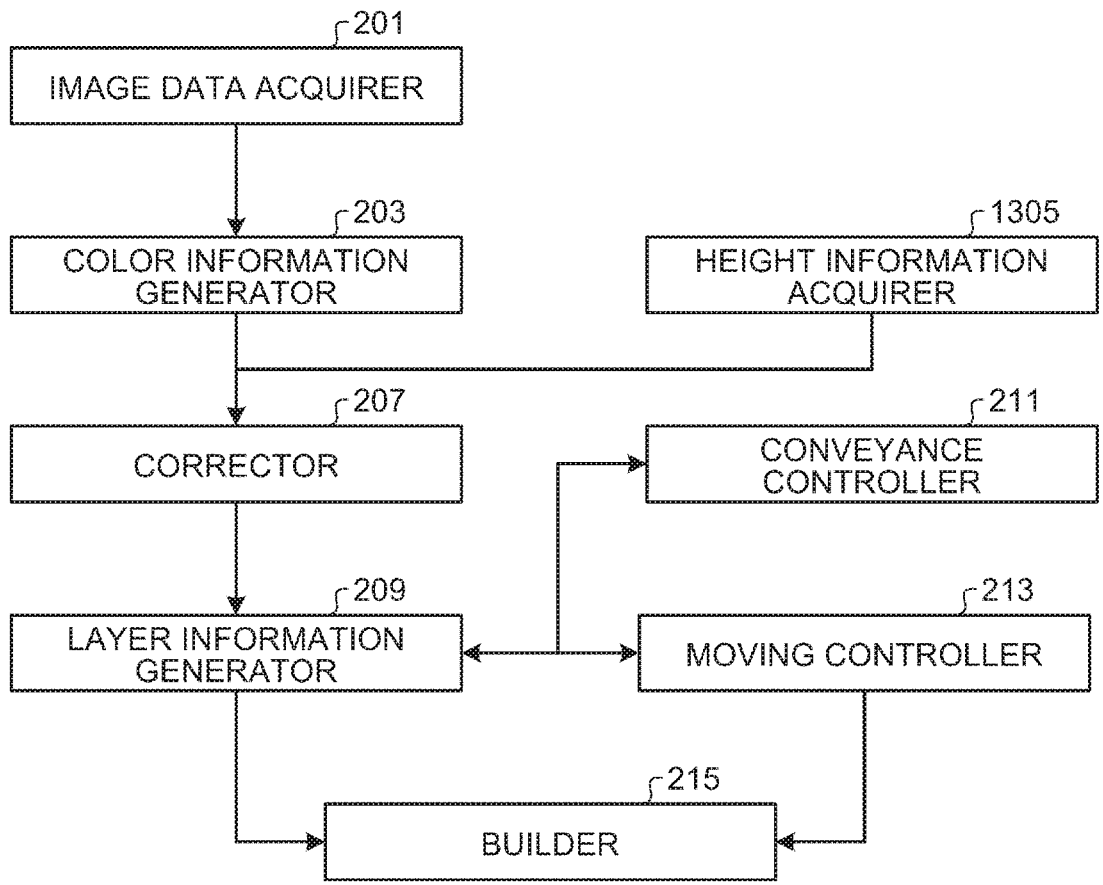
[Fig. 25]
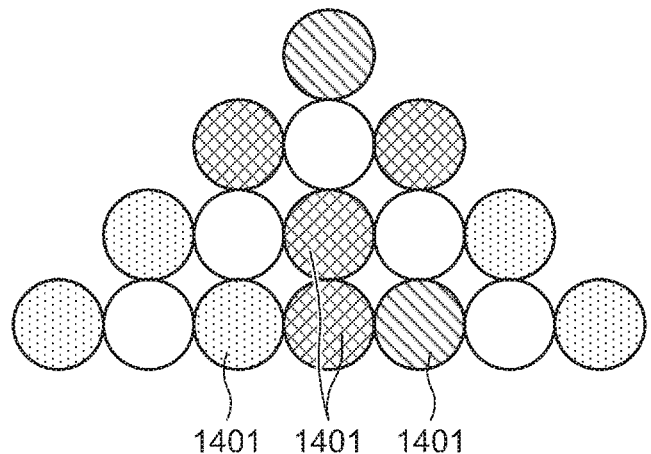

INFORMATION PROCESSING DEVICE, IMAGE FORMING APPARATUS, METHOD FOR MANUFACTURING OUTPUT OBJECT, AND COMPUTER-READABLE RECORDING MEDIUM

TECHNICAL FIELD

The present invention relates to information processing devices, image forming apparatuses, methods for manufacturing an output object, and computer-readable recording media.

BACKGROUND ART

Conventionally known methods for building a three dims s al object include inkjet printing, fused deposition modeling, rapid prototyping, binder jetting, stereolithography, and powder bed fusion.

For example, Patent Literature 1 discloses a technique, which is related to inkjet printing, for building a three-dimensional object by sequentially laying down a build material in layers and applying ink onto the surface of the deposited build material, thereby causing printing on the surface of the three-dimensional object to be completed simultaneously when building of the three-dimensional object is completed.

SUMMARY OF INVENTION

Technical Problem

However, the above-described conventional technique is disadvantageous in that noise, such as a void, a line, uneven color, and a speck, can appear in a portion where printing is applied due to an undercoat seen through the printed portion depending on the angle of viewing the printed portion, whereby color reproducibility of the printed portion can be degraded.

The present invention has been conceived in view of the above-described circumstances and aims at providing an information processing device, an image forming apparatus, a method for manufacturing a three-dimensional object, and a computer-readable recording medium that will allow building a three-dimensional image while preventing degradation in color reproducibility.

Solution to Problem

According to one aspect of the present invention, an information processing device includes a corrector and a layer information generator. The corrector is configured to, when a three-dimensional image is to be built by depositing a build material based on height information indicating heights of the three-dimensional image on a per-pixel basis and based on color information indicating colors of the three-dimensional image on a per-pixel basis, correct the height information so that surface of the three-dimensional image is covered with the colors indicated by the color information. The layer information generator is configured to generate layer information indicating, on a per-layer basis, pixel layouts for building the three-dimensional image whose shape is corrected so that the surface of the three-dimensional image is covered with the colors indicated by the color information, based on the corrected height information and the color information.

Advantageous Effects of Invention

According to an aspect of the present invention, it is advantageously possible to build a three-dimensional image while preventing degradation in color reproducibility.

BRIEF DESCRIPTION OF DRAWINGS

FIG. 1 is a block diagram illustrating an example schematic configuration of an inkjet recording apparatus of a present embodiment.

FIG. 2 is a block diagram illustrating an example hardware configuration of a controller of the present embodiment.

FIG. 3 is a schematic diagram illustrating an example mechanical structure of a head unit of the present embodiment.

FIG. 4 is a block diagram illustrating an example functional configuration of the inkjet recording apparatus of the present embodiment.

FIG. 5 is a diagram illustrating an example of color information of the present embodiment.

FIG. 6 is a diagram illustrating an example of color information of the present embodiment.

FIG. 7 is a diagram illustrating an example of height information of the present embodiment.

FIG. 8 is an explanatory diagram illustrating an example method for generating layer information of the present embodiment.

FIG. 9 is a diagram illustrating an example of the height information of the present embodiment.

FIG. 10 is an explanatory diagram illustrating an example method for correcting height information of the present embodiment.

FIG. 11 is a diagram illustrating an example of layer information of a comparative example.

FIG. 12 is an explanatory diagram illustrating an example method for building a three-dimensional image of the present embodiment.

FIG. 13 is an explanatory diagram illustrating the example method for building the three-dimensional image of the present embodiment.

FIG. 14 is an explanatory diagram illustrating the example method for building the three-dimensional image of the present embodiment.

FIG. 15 is an explanatory diagram illustrating the example method for building the three-dimensional image of the present embodiment.

FIG. 16 is an explanatory diagram illustrating an example method for building a three-dimensional image of the present embodiment.

FIG. 17 is an explanatory diagram illustrating the example method for building the three-dimensional image of the present embodiment.

FIG. 18 is an explanatory diagram illustrating the example method for building the three-dimensional image of the present embodiment.

FIG. 19 is an explanatory diagram illustrating the example method for building the three-dimensional image of the present embodiment.

FIG. 20 is a flowchart illustrating an example procedure for a process for manufacturing a three-dimensional object of the present embodiment.

FIG. 21 is a flowchart illustrating an example of building process of S111 of the flowchart illustrated in FIG. 20.

FIG. 22 is a schematic diagram illustrating an example mechanical structure of a head unit of a first modification.

FIG. 23 is a block diagram illustrating an example functional configuration of an inkjet recording apparatus of a second modification.

FIG. 24 is a block diagram illustrating an example functional configuration of an inkjet recording apparatus of a third modification.

FIG. 25 is an explanatory diagram illustrating an example method for building a three-dimensional image of a fourth modification. The accompanying drawings are intended to depict exemplary embodiments of the present invention and should not be interpreted to limit the scope thereof. Identical or similar reference numerals designate identical or similar components throughout the various drawings.

DESCRIPTION OF EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

Information processing devices, image forming apparatuses, methods for manufacturing a three-dimensional object, and computer-readable recording media according to embodiments of the present invention are described in detail below with reference to the accompanying drawings. Hereinafter, an image forming apparatus is described through an example of, but not limited to, an inkjet recording apparatus that builds (forms) a three-dimensional image on a recording medium by ejecting, as a build material, ultraviolet curable ink (activation-energy curable ink) onto the recording medium from a piezoelectric inkjet head.

The recording medium can be any medium so long as a three-dimensional image can be built thereon. Examples of the recording medium include, but not limited to, recording paper, canvases, films, metals, glass, woods, and corrugated boards. The build material is not limited to ultraviolet curable ink, but may be any build material so long as a particle of the build material is immiscible with another particle of the build material and stable in terms of shape after having been deposited. The build material may be liquid or gel when being deposited. The build material may be ink that is softened or hardened with time or heat.

FIG. 1 is a block diagram illustrating an example schematic configuration of an inkjet recording apparatus 1 of a present embodiment. As illustrated in FIG. 1, the inkjet recording apparatus 1 includes an engine 10 and a controller 100 (an example of the information processing device).

The engine 10 builds (forms) a three-dimensional image on a recording medium. Specifically, the engine 10 builds a three-dimensional image on a recording medium by ejecting, from a head unit 15 included in the engine 10, ultraviolet curable ink to deposit it in layers on the recording medium.

The controller 100 performs control for building (forming) the three-dimensional image on the recording medium. Specifically, the controller 100 generates information for building the three-dimensional image and causes the engine 10 to build the three-dimensional image in accordance with the generated information.

FIG. 2 is a block diagram illustrating an example hardware configuration of the controller 100 of the present embodiment. As illustrated in FIG. 2, the controller 100 has a typical-computer-based hardware configuration and includes a control device 101, such as a CPU (Central Processing Unit), a main storage device 102, such as a ROM (Read Only Memory) and a RAM (Random Access Memory), an auxiliary storage device 103, such as an HDD (Hard Disk Drive) and an SSD (Solid State Drive), a display device 104, such as a display, an input device 105, such as a touch panel and a key switch, and a communication device 106, such as a communication interface.

FIG. 3 is a schematic diagram illustrating an example mechanical structure of the head unit 15 of the present embodiment. As illustrated, in FIG. 3, the head unit 15 includes an inkjet head 14 and an ultraviolet irradiation device 13.

The inkjet head 14 includes a nozzle array 11 that ejects ultraviolet curable ink onto a recording medium 16. FIG. 3 illustrates an example where the nozzle array 11 includes a nozzle 11W for ejecting white (W) ultraviolet curable ink, a nozzle 11CL for ejecting clear (CL) ultraviolet curable ink, a nozzle 11Y for ejecting yellow (Y) ultraviolet curable ink, a nozzle 11M for ejecting magenta (M) ultraviolet curable ink, a nozzle 11C for ejecting cyan (C) ultraviolet curable ink, and a nozzle 11K for ejecting black (K) ultraviolet curable ink. However, the structure of the nozzle array 11 is not limited to this. For example, the nozzle 11CL is not necessarily included in the nozzle array 11. Each of the number of the nozzles 11W, the number of the nozzles 11CL, the number of the nozzles 11Y, the number of the nozzles 11C, the number of the nozzles 11M, and the number of the nozzles 11K may be any number equal to or larger than one.

The white (W) and clear (CL) ultraviolet curable inks are used to build a shape of the three-dimensional image, while the yellow (Y), cyan (C), magenta (M), and black (K) ultraviolet curable inks are used to apply colors to the three-dimensional image.

The ultraviolet irradiation device 13 includes an irradiator 13a that irradiates ultraviolet curable ink 12 deposited on the recording medium 16 by the inkjet head 14 with curing light 13b, which is ultraviolet light. The ultraviolet curable ink 12 deposited on the recording medium 16 is hardened by the curing light 13b emitted from the ultraviolet irradiation device 13.

In the present embodiment, the recording medium 16 is conveyed in the direction (the sub-scanning direction) indicated by an arrow B. When the recording medium 16 has been conveyed to a predetermined position, conveyance of the recording medium 16 is stopped, and the inkjet head 14 starts ejecting ultraviolet curable ink onto the recording medium 16.

Specifically, the head unit 15 reciprocates in the main-scanning direction orthogonal to the sub-scanning direction while moving in the direction (the sub-scanning direction) indicated by an arrow A, causes the inkjet head 14 to eject the ultraviolet curable ink onto the recording medium 16 (more particularly, onto a drawing area on the recording medium 16), and causes the ultraviolet irradiation device 13 to irradiate the recording medium 16 with the curing light 13b.

When the head unit 15 has deposited a single layer of the ultraviolet curable ink on the recording medium 16, the head unit 15 returns to its original position and iterates the above-described operation until n (n≥2) layers of the ultraviolet curable ink have been deposited.

When a three-dimensional image has been built by deposition of the n layers of the ultraviolet curable ink on the recording medium 16, conveyance of the recording medium 16 in the direction indicated by the arrow B is resumed, and the recording medium 16 where the three-dimensional image is built is discharged from the inkjet recording apparatus 1.

Note that the manner, in which the head unit 15 performs ejection, is not limited to that described above. For example, ejection may be performed such that, in a state where the head unit 15 is fixed, the recording medium 16 (more particularly, a table unit or the like where the recording medium 16 is fixed) that is being conveyed in the direction indicated by the arrow B is reciprocated in the main-scanning direction orthogonal to the sub-scanning direction; the inkjet head 14 ejects ultraviolet curable ink onto the recording medium 16; and the ultraviolet irradiation device 13 irradiates the recording medium 16 with the curing light 13b. In this case, when a single layer of the ultraviolet curable ink has been deposited on the recording medium 16, the recording medium 16 is conveyed to its original position. The above-described operation is iterated until the n (n≥2) layers of the ultraviolet curable ink have been deposited.

FIG. 4 is a block diagram illustrating an example functional configuration of the inkjet recording apparatus 1 of the present embodiment. As illustrated in FIG. 4, the inkjet recording apparatus 1 includes an image data acquirer 201, a color information generator 203, a height information generator 205, a corrector 207, a layer information generator 209, a conveyance controller 211, a moving controller 213, and a builder 215.

The image data acquirer 201 can be embodied in the control device 101, the main storage device 102, and the communication device 106, for example. The color information generator 203, the height information generator 205, the corrector 207, the layer information generator 209, and the conveyance controller 211 can be embodied in the control device 101 and the main storage device 102, for example. The moving controller 213 and the builder 215 can be embodied in the head unit 15, for example.

The image data acquirer 201 acquires image data representing a three-dimensional image. Examples of the image data representing a three-dimensional image include image data obtained by capturing an image(s) of a three-dimensional object (i.e., a model of the three-dimensional image) to be reproduced in the three-dimensional image. When, for example, the three-dimensional object to be reproduced in a three-dimensional image is a painting, image data representing the three-dimensional image may be image data obtained by capturing an image of the painting.

The image data acquirer 201 may acquire image data representing a three-dimensional image from an external apparatus, such as a PC (Personal Computer) or, alternatively, acquire image data representing a three-dimensional image stored in the auxiliary storage device 103 or the like. The present embodiment is described through an example where image data representing a three-dimensional image is RGB image data, but is not limited thereto.

The color information generator 203 generates, from the image data representing the three-dimensional image acquired by the image data acquirer 201, color information indicating, on a per-pixel basis, colors of the three-dimensional image. For example, the color information generator 203 may generate the color information by performing color transformation from RGB image data acquired by the image data acquirer 201 into CMYK image data. Color transformation (color space transformation) from RGB to CMYK may preferably be performed using a known technique. Note that, because the generated color information is used in building a three-dimensional image, processing specific to three-dimensional image building may be additionally performed.

FIG. 5 and FIG. 6 are diagrams illustrating an example of the color information of the present embodiment. In the present embodiment, as illustrated in FIG. 5, it is assumed that the color information is information about a single layer. This is because if different colors are overlaid on one another when being deposited, color reproducibility will be undesirably degraded. For this reason, as illustrated in FIG. 6, when color information about a plurality of layers is generated, in principle, color information about the first layer is used, and color information about the second and upper layers is not used. Hence, in the present embodiment, it is assumed that the color information is two-dimensional information (which is illustrated one dimensionally in FIG. 5 and FIG. 6).

In the example illustrated in FIG. 5, reference symbol Y indicates that the color of the pixel (hereinafter, sometimes referred to as "dot") is yellow; reference symbol C indicates that the color of the pixel is cyan; reference symbol M indicates that the color of the pixel is magenta; and reference symbol K indicates that the color of a pixel is black. In the following description, it is assumed that the color of a pixel in the same fill pattern as the pixels with the reference symbol Y is yellow; the color of a pixel in the same fill pattern as the pixels with the reference symbol C is cyan; the color of a pixel in the same fill pattern as the pixel with the reference symbol M is magenta; the color of a pixel in the same fill pattern as the pixel with the reference symbol K is black.

The height information generator 205 generates, from the image data representing the three-dimensional image acquired by the image data acquirer 201, height information indicating, on a per-pixel basis, heights of the three-dimensional image. The height information may be generated using a known technique, e.g., that disclosed in Japanese Laid-open Patent Publication No. 2013-230625, of obtaining the height (Z coordinate) of each pixel from two-dimensional image data.

FIG. 7 is a diagram illustrating an example of the height information of the present embodiment. In the present embodiment, as illustrated in FIG. 7, the height information is information about a plurality of layers. Specifically, in the present embodiment, the height information is three-dimensional information (which is illustrated two dimensionally in FIG. 7) and in many cases information representing a pyramidal shape whose base is at its bottom as illustrated in FIG. 7. However, the height information is not limited thereto, and may have exceptions. The exceptions will be described later.

Prior to describing the corrector 207, an overview of generation of layer information by the layer information generator 209 is described below. The layer information generator 209 generates layer information (slice information) indicating, on a per-layer basis, pixel layouts for building a three-dimensional image.

FIG. 8 is an explanatory diagram illustrating an example method for generating the layer information of the present embodiment. In the present embodiment, as illustrated in FIG. 8, the layer information generator 209 generates three-dimensional image information, from which layer information is to be derived, by arranging dots indicated by the color information generated by the color information generator 203 on dots indicated by the height information generated by the height information generator 205. The layer information generator 209 generates layer information (which is, in the example illustrated in FIG. 8, layer information about four layers) indicating pixel layouts on a per-layer basis by separating the three-dimensional image information on a per-layer basis. Furthermore, the layer information generator 209 separates the generated layer information into structural layer information representing a dot layout for a shape and color layer information representing a dot layout for colors. In the example illustrated in FIG. 8, layer information about the fourth layer, which is the topmost layer, includes only color layer information.

The height of each layer is a height (post-landing dot height) H of dots (dots determined by 25400/P, which is image resolution of height forming dots, and the diameter of the height forming dots) indicated by the height information and formed with ultraviolet curable ink. An angle of deposited layers, which is a slope angle of a side of the shape (i.e., the shape represented by the height information) of the three-dimensional image, is expressed as $\theta=\tan^{-1}(H/P)$. The deposited layers' angle is desirably such that the shape represented by the height information is approximation to the shape of the three-dimensional image. The diameter of the height forming dots and 25400/P, which is the image resolution, are determined by the deposited layers' angle.

The ultraviolet curable ink, which is formed into the dots indicated by the color information, is formed on the ultraviolet curable ink formed into the dots indicated by the height information in a fashion to cover the ultraviolet curable ink. Therefore, it is a precondition that the diameter (color dot diameter) of dots indicated by the color information and image resolution of the color dots be determined to satisfy the above-described condition. Furthermore, the color dot diameter and the image resolution of the color dots are desirably determined with an eye to increase color reproducibility and achieve high image quality. Specifically, it is desirable that the image resolution of the color dots is higher than the image resolution of the height forming dots, that the color dot diameter is smaller than the height forming dot diameter, and that the amount of ultraviolet curable ink to be ejected to apply a color is larger than the height forming dot diameter.

The description of the corrector 207 is given below. As described above, the deposited layers' angle, which is the slope angle of the side of the shape (i.e., the shape represented by the height information) of the three-dimensional image, desirably satisfies $\theta=\tan^{-1}(H/P)$. However, with some height information, the deposited layers' angle may not satisfy $\theta=\tan^{-1}(H/P)$.

FIG. 9 is a diagram illustrating an example of the height information of the present embodiment. The height information illustrated in FIG. 9 does not represent a pyramidal shape whose base is at its bottom but represents a shape having a vertical portion and an overhung portion. Therefore, the deposited layers' angle of the shape represented by the height information illustrated in FIG. 9 does not satisfy $\theta=\tan^{-1}(H/P)$.

With this being the situation, the corrector 207 corrects the height information so as to make the slope angle (the deposited layers' angle) of the side of the shape of the three-dimensional image substantially equal to an angle of $\tan^{-1}((\text{the diameter of a build material to be deposited})/(\text{the inverse of the resolution}))$. For example, when the height information illustrated in FIG. 9 is given, the corrector 207 performs correction of deleting a dot 231 of the vertical portion and dots 230 and 233 of the overhung portion, which are the causes that prevent satisfying $\theta=\tan^{-1}(H/P)$, so that the height information represents a shape, from which the dot 231 of the vertical portion and the dots 230 and 233 of the overhung portion are deleted, as illustrated in FIG. 10.

If the layer information generator 209 generates layer-by-layer layer information without correcting the height information illustrated in FIG. 9, such layer-by-layer layer information as that illustrated in FIG. 11 is obtained. When a three-dimensional image is built in accordance with the layer information illustrated in FIG. 11, ultraviolet curable ink formed into the dots 231 and 233 and dots 234 and 235 indicated by the height information have portions that are not covered with ultraviolet curable ink formed into dots indicated by the color information. Hence, whereas the ultraviolet curable ink formed into the dots indicated by the height information are not exposed when the three-dimensional image is viewed along an arrow C, the ultraviolet curable ink formed into the dots 233 and 234 indicated by the height information are undesirably exposed when the three-dimensional image is viewed along an arrow D, and the ultraviolet curable ink formed into the dot 231 indicated by the height information is undesirably exposed when the three-dimensional image is viewed along an arrow E. As a result, noise, such as a void, a line, uneven color, and a speck, appears in the three-dimensional image and undesirably degrades color reproducibility of the three-dimensional image.

In view of this, the above-described height information correction is performed in the present embodiment. Because the corrected height information is similar to the height information illustrated in FIG. 7, layer information generated by the layer information generator 209 using the corrected height information is similar to the layer information illustrated in FIG. 8. In this case, as described above, ultraviolet curable ink, which is formed into dots indicated by color information, is formed on ultraviolet curable ink formed into dots indicated by the height information in a fashion to cover the ultraviolet curable ink. Accordingly, noise, such as a void, a line, uneven color, and a speck, will not appear in the three-dimensional image, and degradation in color reproducibility of the three-dimensional image can be prevented.

Hence, when a three-dimensional image is to be built by depositing ultraviolet curable ink in accordance with color information generated the color information generator 203 and height information generated by the height information generator 205, the corrector 207 corrects the height information so that the surface of the three-dimensional image is covered with a color or colors (hereinafter, simply referred to as "colors") indicated by the color information. Specifically, the corrector 207 corrects, on the basis of the resolution of the three-dimensional image (the height information), the height information so that the surface of the three-dimensional image is covered with the colors indicated by the color information.

Thereafter, the layer information generator 209 generates layer-by-layer layer information for building the three-dimensional image, whose shape is corrected so that the surface of the three-dimensional image is covered with the colors indicated by the color information, on the basis of the color information generated by the color information generator 203 and the height information corrected by the corrector 207.

The conveyance controller 211 controls conveyance of a recording medium, on which the three-dimensional image is to be built by the head unit 15.

The moving controller 213 controls moving of the head unit 15.

The builder 215 causes the ultraviolet curable ink to be deposited on the recording medium in accordance with the layer-by-layer layer information generated by the layer information generator 209, thereby building the corrected three-dimensional image. The builder 215 builds the shape of the corrected three-dimensional image using ultraviolet curable ink of a color different from the colors indicated by the color information. In the present embodiment, the builder 215 builds the shape of the corrected three-dimensional image using, but not limited to, the white (W) ultraviolet curable ink. The builder 215 may alternatively use the clear (CL) ultraviolet curable ink or, further alternatively, may use a mixture of the white (W) ultraviolet curable ink and the clear (CL) ultraviolet curable ink.

In the present embodiment, the builder 215 performs deposition of ultraviolet curable ink based on color layer information for one layer on a layer m layers (m is a natural number greater than zero) apart and delayed from a layer where deposition based on structural layer information for the same one layer is performed.

A deposition method for a case where m=1 is described below. The description below is made through an example of the layer information illustrated in FIG. 8.

Firstly, as illustrated in FIG. 12, the builder 215 deposits dots 241 indicated by structural layer information for the first layer on a recording medium using the white (W) ultraviolet curable ink.

Next, as illustrated in FIG. 13, the builder 215 deposits dots 251 indicated by structural layer information for the second layer on the dots 241 using the white (W) ultraviolet curable ink and deposits dots 242 indicated by color layer information for the first layer on the recording medium using the yellow (Y) ultraviolet curable ink.

Next, as illustrated in FIG. 14, the builder 215 deposits a dot 261 indicated by structural layer information for the third layer on the dot 251 using the white (W) ultraviolet curable ink and deposits dots 252 indicated by color layer information for the second layer on the dots 241 using the yellow (Y) ultraviolet curable ink.

Lastly, as illustrated in FIG. 15, the builder 215 deposits dots 262 indicated by color layer information for the third layer on the dots 251 using the cyan (C) ultraviolet curable ink and deposits a dot 272 indicated by color layer information for the fourth layer on the dot 261 using the magenta (M) ultraviolet curable ink.

A deposition method for a case where m=2 is described below. The description below is also made through an example of the layer information illustrated in FIG. 8.

Firstly, as illustrated in FIG. 16, the builder 215 deposits the dots 241 indicated by the structural layer information for the first layer on a recording medium using the white (W) ultraviolet curable ink.

Next, as illustrated in FIG. 17, the builder 215 deposits the dots 251 indicated by the structural layer information for the second layer on the dots 241 using the white (W) ultraviolet curable ink.

Next, as illustrated in FIG. 18, the builder 215 deposits the dot 261 indicated by the structural layer information for the third layer on the dot 251 using the white (W) ultraviolet curable ink and deposits the dots 242 indicated by the color layer information for the first layer on the recording medium using the yellow (Y) ultraviolet curable ink.

Lastly, as illustrated in FIG. 19, the builder 215 deposits the dots 252 indicated by the color layer information for the second layer on the dots 241 using the yellow (Y) ultraviolet curable ink. The builder 215 deposits the dots 262 indicated by the color layer information for the third layer on the dots 251 using the cyan (C) ultraviolet curable ink and deposits the dot 272 indicated by the color layer information for the fourth layer on the dot 261 using the magenta (M) ultraviolet curable ink.

As the value of m decreases, the distance, over which ultraviolet curable ink ejected from the head unit 15 travels, decreases. As a result, building accuracy of the three-dimensional image can be increased. As the value of m increases, the number of times when ultraviolet curable ink for applying the colors, such as yellow (Y), cyan (C), and magenta (M), is irradiated with curing light, which is ultraviolet light, decreases. As a result, because degradation in these ultraviolet curable inks can be prevented, color reproducibility of the three-dimensional image can be further increased.

FIG. 20 is a flowchart illustrating an example procedure for a process for manufacturing a three-dimensional object of the present embodiment.

Firstly, the image data acquirer 201 acquires image data representing a three-dimensional image (S101).

Thereafter, the color information generator 203 generates, from the image data representing the three-dimensional image acquired by the image data acquirer 201, color information indicating, on a per-pixel basis, colors of the three-dimensional image (S103).

Thereafter, the height information generator 205 generates, from the image data representing the three-dimensional image acquired by the image data acquirer 201, height information indicating, on a per-pixel basis, heights of the three-dimensional image (S105).

Thereafter, when the three-dimensional image is to be built by depositing ultraviolet curable ink in accordance with the color information generated the color information generator 203 and the height information generated by the height information generator 205, the corrector 207 corrects the height information so that the surface of the three-dimensional image is covered with the colors indicated by the color information (S107).

Thereafter, the layer information generator 209 generates layer-by-layer layer information for building the three-dimensional image, whose shape is corrected so that the surface of the three-dimensional image is covered with the colors indicated by the color information, on the basis of the color information generated by the color information generator 203 and the height information corrected by the corrector 207 (S109).

Thereafter, the builder 215 performs a building process of causing the ultraviolet curable ink to be deposited on a recording medium in accordance with the layer-by-layer layer information generated by the layer information generator 209, thereby building the corrected three-dimensional image (S111).

FIG. 21 is a flowchart illustrating an example of the building process of S111 of the flowchart illustrated in FIG. 20. In the example illustrated in FIG. 21, it is assumed that deposition of ultraviolet curable ink based on the color layer information is not performed when i−m (i is a natural number greater than one) is zero or smaller. In addition, n is the topmost layer; m is a natural number greater than zero as described above.

Firstly, the builder 215 deposits dots indicated by structural layer information for the first layer on the recording medium using ultraviolet curable ink (S201).

Thereafter, the builder 215 deposits, using ultraviolet curable ink, dots indicated by structural layer information for the second layer on the dots indicated by the structural layer information for the first layer and deposits dots indicated by color layer information for the $(2-m)^{th}$ layer on the recording medium (S203).

The builder 215 deposits, using ultraviolet curable ink, dots indicated by structural layer information for the $i^{th}$ layer on dots indicated by structural layer information for the $(i-1)^{th}$ layer and deposits dots indicated by color layer information for the $(i-m)^{th}$ layer on the recording medium or dots indicated by structural layer information for the $(i-m-1)^{th}$ layer until the value of i reaches n−1. In this example, the value of i, which starts from three, is incremented each time a loop is completed.

Thereafter, the builder 215 deposits, using ultraviolet curable ink, dots indicated by structural layer information for the $n^{th}$ layer on dots indicated by structural layer information for the $(n-1)^{th}$ layer and deposits dots indicated by color layer information for the $(n-m)^{th}$ layer on dots indicated by structural layer information for the $(n-m-1)^{th}$ layer (S205).

Lastly, the builder 215 deposits, using ultraviolet curable ink, dots indicated by color layer information for the $(n-m+1)^{th}$ layer to dots indicated by color layer information for the $n^{th}$ layer on dots indicated by structural layer information for the $(n-m)^{th}$ layer to the dots indicated by the structural layer information for the $(n-1)^{th}$ layer, respectively (S207).

As described above, in the present embodiment, height information is corrected so that the surface of a three-dimensional image is covered with colors indicated by color information, and layer-by-layer layer information is generated using the corrected height information and the color information. Therefore, when a three-dimensional image is built using the layer-by-layer layer information, ultraviolet curable ink, which is formed into dots indicated by the color information, is formed on ultraviolet curable ink, which is formed into dots indicated by the height information, in a fashion to cover the ultraviolet curable ink. Accordingly, even when the three-dimensional image is viewed from different angles, noise, such as a void, a line, uneven color, and a speck, will not appear, and degradation in color reproducibility of the three-dimensional image can be prevented.

In the present embodiment, the color information is information for a single layer. Because a three-dimensional image is built without depositing ultraviolet curable ink, which is formed into dots indicated by the color information, in a fashion to overlay the ultraviolet curable ink on ultraviolet curable ink, which is formed into dots indicated by other color information, color reproducibility of the three-dimensional image can be increased.

As the disparity between a layer where ultraviolet curable ink is deposited in accordance with color layer information for one layer and a layer where ultraviolet curable ink is deposited in accordance with structural layer information for the same one layer decreases, the distance, over which the ultraviolet curable ink ejected from the head unit 15 travels, decreases. As a result, building accuracy of the three-dimensional image can be increased.

As the disparity between a layer where ultraviolet curable ink is deposited in accordance with color layer information for one layer and a layer where ultraviolet curable ink is deposited in accordance with structural layer information for the same one layer increases, the number of times when the ultraviolet curable ink for applying the colors, such as yellow (Y), cyan (C), and magenta (M), is irradiated with curing light, which is ultraviolet light, decreases. As a result, because degradation in these ultraviolet curable inks can be prevented, color reproducibility of the three-dimensional image can be further increased.

First Modification

The description given above of the embodiment is based on inkjet printing. In a first modification, a mechanical structure of a head unit 1015 that performs fused deposition modeling is described.

FIG. 22 is a schematic diagram illustrating an example mechanical structure of the head unit 1015 of the first modification. As illustrated in FIG. 22, the head unit 1015 includes a melting (thermal) head 1020.

The melting head 1020 has hot-melt ink 1023 and discharges the hot-melt ink 1023 onto the recording medium 16 by heating the hot-melt ink 1023. The hot-melt ink 1023 includes, as in the case of inkjet printing, white (W) hot-melt ink, clear (CL) hot-melt ink, yellow (Y) hot-melt ink, cyan (C) hot-melt ink, magenta (M) hot-melt ink, and black (K) hot-melt ink.

Second Modification

FIG. 23 is a block diagram illustrating an example functional configuration of an inkjet recording apparatus of a second modification, which differs from the above-described embodiment in a height information generator 1205. The height information generator 1205 may generate the height information by three-dimensionally measuring a three-dimensional object to be reproduced in a three-dimensional image. The height information generator 1205 may generate the height information by using both image data representing the three-dimensional image acquired by the image data acquirer 201 and three-dimensional measurement of a three-dimensional object to be reproduced in the three-dimensional image.

Third Modification

FIG. 24 is a block diagram illustrating an example functional configuration of an inkjet recording apparatus of a third modification, which differs from the above-described embodiment in a height information acquirer 1305. The height information acquirer 1305 may be configured to acquire the height information about the three-dimensional image. When, for example, a three-dimensional object to be reproduced in the three-dimensional image is a painting, it is possible that the height information is stored and managed as data in an art museum or the like where the painting is kept. The height information acquirer 1305 may be configured to acquire the height information about the three-dimensional image from the external source in such a case.

Fourth Modification

In the above-described embodiment, the builder 215 builds the shape of the corrected three-dimensional image using ultraviolet curable ink of a color different from the colors indicated by the color information. Alternatively, as illustrated in FIG. 25, the builder 215 may be configured to build a portion, on which any one of the colors indicated by the color information is to be deposited, of the shape of the corrected three-dimensional image using ultraviolet curable ink of a color different from the colors indicated by the color information, but builds other portions (dots 1401) than the portion using ultraviolet curable ink of any arbitrary color. This configuration allows increasing a building speed of the three-dimensional image while simultaneously increasing color reproducibility of the three-dimensional image.

Fifth Modification

In the above-described embodiment, the entire surface of the three-dimensional image is covered with the colors indicated by the color information. Alternatively, a configuration in which, when a part of the surface of the three-dimensional image is to be colored, covers the to-be-colored part of the surface of the three-dimensional image with the colors indicated by the color information may be employed.

Sixth Modification

The embodiment is described through the example of the inkjet recording apparatus that builds a three-dimensional image while conveying a recording medium. Alternatively, the inkjet recording apparatus may be a flatbed inkjet recording apparatus that builds a three-dimensional image by moving a head unit horizontally and vertically rather than conveying a recording medium.

Program Instructions

Program instructions to be executed in the inkjet recording apparatus 1 of the embodiment and the modifications may be provided as an installable file or an executable file recorded in a computer-readable recording medium, such as a CD-ROM, a CD-R, a memory card, a DVD (Digital Versatile Disk), and a flexible disk (FD).

Alternatively, the program instructions to be executed in the inkjet recording apparatus 1 of the embodiment and the modifications may be configured to be stored in a computer connected to a network, such as the Internet, and provided by being downloaded over the network. The inkjet recording apparatus 1 of the embodiment and the modifications may be configured to be provided or delivered via a network, such as the Internet. The program instructions to be executed in the inkjet recording apparatus 1 of the embodiment and the modifications may be configured to be provided in a form of preinstalled in a ROM or the like.

The program instructions to be executed in the inkjet recording apparatus 1 of the embodiment and the modifications are in a module configuration for implementing the above-described parts on a computer. Actual hardware may be configured such that, for example, a CPU reads out the program instructions from a ROM and executes the program instructions, thereby implementing the above-described functional parts on the computer.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

1 Inkjet recording apparatus
10 Engine
12 Nozzle array
13 Ultraviolet irradiation device
13a Irradiator
14 Inkjet head
15 Head unit
100 Controller
101 Control device
102 Main storage device
103 Auxiliary storage device
104 Display device
105 Input device
106 Communication device
201 Image data acquirer
203 Color information generator
205 Height information generator
207 Corrector
209 Layer information generator
211 Conveyance controller
213 Moving controller
215 Builder

CITATION LIST

Patent Literature

PTL 1: Japanese Unexamined Patent Application Publication No. 2013-43338

The invention claimed is:

1. An information processing device comprising:
a memory storing computer readable instructions; and
one or more processors configured to execute the computer readable instructions such that the one or more processors are configured to,
when a three-dimensional image is to be built by depositing a build material based on height information indicating heights of the three-dimensional image on a per-pixel basis and based on color information indicating colors of the three-dimensional image on a per-pixel basis, correct the height information so that surface of the three-dimensional image is covered with the colors indicated by the color information; and
generate layer information indicating, on a per-layer basis, pixel layouts for building the three-dimensional image whose shape is corrected so that the surface of the three-dimensional image is covered with the colors indicated by the color information, based on the corrected height information and the color information.

2. The information processing device according to claim 1, wherein the one or more processors correct the height information so that the surface of the three-dimensional image is covered with the colors indicated by the color information based on resolution of the three-dimensional image.

3. The information processing device according to claim 2, wherein the one or more processors correct the height information so as to make a slope angle of a side of the shape of the three-dimensional image substantially equal to an angle of $\tan^{-1}$ ((the diameter of the build material to be deposited)/(the inverse of the resolution)).

4. The information processing device according to claim 1, wherein
the color information is information for a single layer, and
the build material for building the shape of a corrected three-dimensional image is of a color different from the colors indicated by the color information.

5. The information processing device according to claim 1, wherein
the color information is information for a single layer, and
the build material for building a portion, on which any one of the colors indicated by the color information is to be deposited, of the shape of a corrected three-dimensional image is of a color different from the colors indicated by the color information.

6. The information processing device according to claim 1, wherein the one or more processors are further configured to generate the height information based on any one of image data representing the three-dimensional image and a three-dimensional object to be reproduced in the three-dimensional image.

7. The information processing device according to claim 1, wherein the one or more processors are further configured to acquire the height information.

8. The information processing device according to claim 1, wherein the one or more processors are further configured to generate the color information based on image data representing the three-dimensional image.

9. An image forming apparatus comprising:
the information processing device according to claim 1; and
a builder configured to cause a build material to be deposited on a recording medium in accordance with layer-by-layer layer information, thereby building the corrected three-dimensional image.

10. The image forming apparatus according to claim 9, wherein
the layer information is made up of structural layer information representing a dot layout for the shape and color layer information representing a dot layout for the colors, and
the builder performs deposition of the build material based on the color layer information for one layer on a layer m layers apart and delayed from a layer where deposition based on the structural layer information for the same one layer is performed, where m is a natural number greater than zero.

11. The image forming apparatus according to claim 9, wherein the build material is such that a particle of the build material is immiscible with another particle of the build material and is stable in terms of shape after having been deposited.

12. The image forming apparatus according to claim 9, wherein the build material is liquid or gel when being deposited.

13. The image forming apparatus according to claim 9, wherein the build material is any one of ink that is softened or hardened with time or heat and activation-energy curable ink that is hardened when irradiated with ultraviolet energy.

14. The image forming apparatus according to claim 9, wherein the builder is any one of a piezoelectric inkjet head and a melting thermal head.

15. The information processing device according to claim 1, wherein the one or more processors are configured to correct the height information so that an exterior surface of the three-dimensional image is covered with color dots having a diameter smaller than a diameter of height forming dots.

16. The information processing device according to claim 1, wherein said color includes yellow, cyan, magenta and black.

17. A method for manufacturing a three-dimensional object using a build material and a recording medium, the method comprising:
correcting, when a three-dimensional image is to be built by depositing the build material based on height information indicating, on a per-pixel basis, heights of the three-dimensional image and based on color information indicating, on a per-pixel basis, colors of the three-dimensional image, the height information so that surface of the three-dimensional image is covered with the colors indicated by the color information;
generating layer information, the layer information indicating, on a per-layer basis, pixel layouts for building the three-dimensional image whose shape is corrected so that the surface of the three-dimensional image is covered with the colors indicated by the color information, based on the corrected height information and the color information; and
building the corrected three-dimensional image by causing the build material to be deposited on the recording medium in accordance with layer-by-layer layer information.

18. A non-transitory computer-readable recording medium containing program instructions that, when executed by a computer, causes the computer to perform:
correcting, when a three-dimensional image is to be built by depositing a build material based on height information indicating, on a per-pixel basis, heights of the three-dimensional image and based on color information indicating, on a per-pixel basis, colors of the three-dimensional image, the height information so that surface of the three-dimensional image is covered with the colors indicated by the color information; and generating layer information, the layer information indicating, on a per-layer basis, pixel layouts for building the three-dimensional image whose shape is corrected so that the surface of the three-dimensional image is covered with the colors indicated by the color information, based on the corrected height information and the color information.

19. An information processing device comprising:

a corrector configured to, when receive a three-dimensional image information is to be built by for depositing a build material based on height information indicating heights of the three-dimensional image on a non-color per-pixel basis to form a shape of the three-dimensional image, and based on color information indicating colors of the three-dimensional image on a per-pixel basis, correct the height information when the shape of the three-dimensional image has a vertical portion and/or an overhang portion for removing the vertical portion and/or the overhang portion, and receive color information indicating colors of the three-dimensional image on a color per-pixel basis for depositing the build material on the three-dimensional image whose shape is corrected so that surface of the three-dimensional image is covered with the colors indicated by the color information; and a layer information generator configured to generate layer information indicating, on a per-layer basis, pixel layouts for building the three-dimensional image whose shape is corrected so that the surface of the three-dimensional image is covered with the colors indicated by the color information, based on the corrected height information and the color information.

20. The information processing device according to claim 19, wherein said non-color includes white and clear.

* * * * *